(12) United States Patent
Kaplan (10) Patent No.: US 8,346,601 B2
(45) Date of Patent: Jan. 1, 2013

(54) SYSTEM AND METHOD FOR MANAGING PROMOTIONAL SAVINGS USING A COMMUNICATIONS PLATFORM

(75) Inventor: Mark Mitchell Kaplan, New York, NY (US)

(73) Assignee: Growth & Emerging Markets, LLC, Jersey City, NJ (US)

( * ) Notice: Subject to any disclaimer, the term of this patent is extended or adjusted under 35 U.S.C. 154(b) by 221 days.

(21) Appl. No.: 12/627,904

(22) Filed: Nov. 30, 2009

(65) Prior Publication Data

US 2011/0131090 A1   Jun. 2, 2011

(51) Int. Cl.
*G06Q 30/00* (2012.01)
(52) U.S. Cl. ..................................... 705/14.1
(58) Field of Classification Search .............. 705/14.1
See application file for complete search history.

(56) References Cited

U.S. PATENT DOCUMENTS

| | | | |
|---|---|---|---|
| 7,599,850 B1 | 10/2009 | Laor | |
| 2007/0203788 A1* | 8/2007 | Andalib et al. | 705/14 |
| 2008/0027810 A1 | 1/2008 | Lerner et al. | |
| 2008/0201230 A1 | 8/2008 | Hardison | |
| 2008/0255929 A1 | 10/2008 | Mouton | |
| 2008/0319846 A1 | 12/2008 | Leming et al. | |
| 2009/0150218 A1 | 6/2009 | Brunner et al. | |

OTHER PUBLICATIONS

International Search Report and Written Opinion from PCT/US2010/58331, filed Nov. 30, 2010.

* cited by examiner

*Primary Examiner* — Daniel Lastra
(74) *Attorney, Agent, or Firm* — Loeb & Loeb LLP (57) ABSTRACT

A system and method for processing promotional savings using existing communications platforms. A plurality of promotional codes are assigned and stored in a promotions database. These promotional codes are positioned by marketers on products, packaging, or the like, along with instructions informing consumers to transmit the promotional code to a predefined destination address, such as a phone number, a short code text number, or an email address. After a message containing the promotional code is received from the consumer, the received code is parsed from the message, validated, and a promotional savings value associated with the code is identified. That amount is communicated to an operator of at least one account associated the consumer, and applied as a savings to the operator's billing statement.

21 Claims, 5 Drawing Sheets

WIRELESS CARRIER BILL

National Voice Plan.................................................. $40.00

Text Plan.............................................................. $5.00

Data Plan............................................................. $20.00

One time Rebate from Marketer X.....................$1.50

Taxes.................................................................. $10.00

Total.................................................................. $73.50

FIG. 5

SYSTEM AND METHOD FOR MANAGING PROMOTIONAL SAVINGS USING A COMMUNICATIONS PLATFORM

TECHNICAL FIELD OF THE DISCLOSURE

This disclosure relates generally to promotional systems and more particularly, to a system and method for managing promotional savings using a communications platform.

BACKGROUND OF THE DISCLOSURE

Currently, promotional systems are executed in two ways. The first method is a manufacturer direct promotion, most commonly known as a rebate. In this model, consumers purchase a product then provide proof of purchase to the manufacturer by mailing in a proof of purchase or entering proof of purchase into a website. This model is both expensive for the manufacturer due to the administration cost of accepting proof of purchase, then requires the manufacturer to issue payment to the consumer via mail. The inefficiencies are found both in cost of administration and postage costs for remittance to the consumer.

The second method, commonly known as "coupons," involves a promotional discount code that is generally found in physical form as Free Standing Inserts or "FSIs". These require consumers to select their desired offers and bring the promotional media with them to the store. These FSIs are then scanned and applied to the total cost at checkout. FSIs are generally inefficient for consumers because the consumers often leave the physical media at home. From a marketers perspective, there are also inefficiencies due to the inability to provide coupons that can be utilized across various retailers.

Accordingly, there is a need for a system and method for handling promotional savings that reduce the inefficiencies for both consumers and marketers.

SUMMARY OF THE INVENTION

The present invention includes a system for processing promotion savings. The system includes a promotional system in communication with one or more marketers, one or more operators, and one or more consumer devices via a communication network, the promotion system. The promotional system includes a promotions database, a communications interface, and a messaging platform. The promotions database may be configured to store a plurality of promotional codes, where each of the plurality of promotional codes is associated with at least one marketer and a promotional value. The communications interface may be configured to receive discount request messages from a plurality of consumer devices across the communications network, where the discount request messages include at least one of the plurality of promotional codes. The messaging platform may be the configured to identify a promotional code within the received discount request messages, authenticate the promotional code by reference to the promotions database, identify an operator associated with a consumer that transmitted the discount request: and determine a promotional value associated with the promotional code. The messaging platform may also be configured to transmit to the identified operator a transaction message including information regarding the consumer that transmitted the discount request message and the determined promotional value whereby, after receiving the transaction message, the identified operator applies the determined promotional value to an operator bill for the consumer that transmitted the discount request.

In another aspect, the present invention includes a method for processing promotion savings. The method comprises (a) providing a promotions database for storing a plurality of promotional codes, where each of the plurality of promotional codes is associated with at least at one marketer and a promotional value; (b) receiving, at a communications interface, a discount request messages from a consumer device, wherein the discount request messages including at least one of the plurality of promotional codes; (c) authenticating the promotional code by reference to the promotions database; (d) determining a promotional value associated with the promotional code; (e) identifying an operator associated with the consumer device; and (f) transmitting to the identified operator a transaction message including information regarding the consumer device that transmitted the discount request message and the determined promotional value whereby, after receiving the transaction message, the identified operator applies the determined promotional value to an operator bill for the consumer that transmitted the discount request.

BRIEF DESCRIPTION OF THE FIGURES

Various embodiment of the disclosure are now described, by way of example only, with reference to the accompanying figures.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help improve the understanding of various embodiments of the present disclosure. Also, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

DETAILED DESCRIPTION OF THE DISCLOSURE

The present disclosure provides a system and method for processing promotional savings using existing communications platforms. In general, a plurality of promotional codes are assigned and stored in a promotions database. These promotional codes are positioned by marketers on products, packaging, or the like, along with instructions informing consumers to transmit the promotional code to a predefined destination address, such as a phone number, a short code text number, or an email address. After a message containing the promotional code is received from the consumer, the received code is parsed from the message, validated, and a promotional savings value associated with the code is identified. That amount is then communicated to an operator of at least one account associated the consumer, and applied as a savings to the operator's billing statement. As a result, the promotional savings from the marketer are dynamically and quickly applied as a consumer savings directly on the operator's bill.

Figure 1:
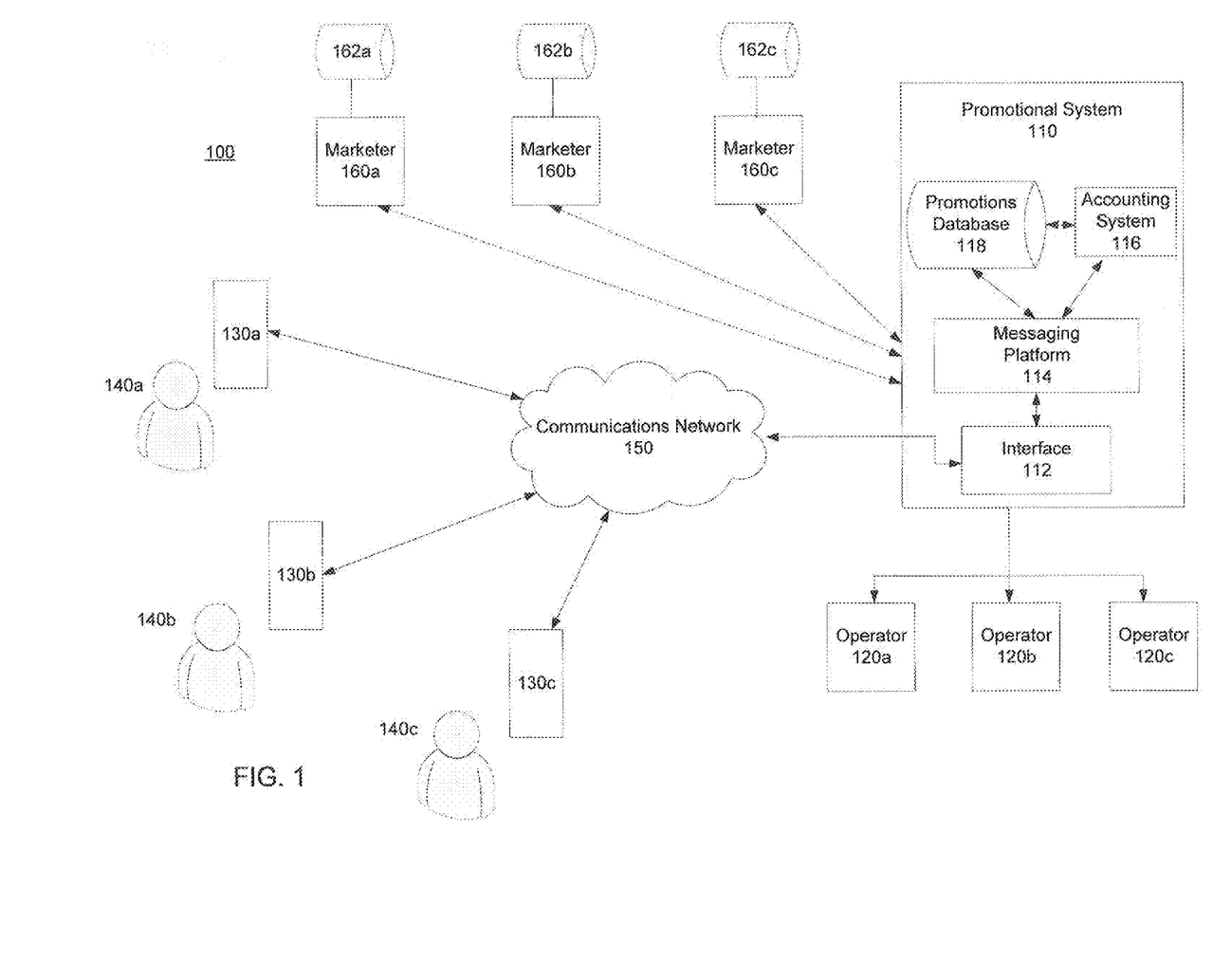
FIG. 1 shows one embodiment of a promotional system in accordance with the present invention.

FIG. 1 illustrates one embodiment of a system 100 in accordance with the present invention 100. The system 100 includes a promotional system 110 that is configured to communicate with a plurality of marketers 160a-c and operators 120a-c. For purposes of this description, a marketer may be any advertiser, manufacture, wholesaler, retailer, or other provider of goods or services. An operator may also be any operator of services that are provided and billed to consumers on a regular basis. This may include, for example, wireless carriers, land-line telephone operators, credit card providers, television providers, or household utilities.

The promotional system 110 is also connected to a communications network 150 in order to communicate with a plurality of consumer communications devices 130a-c operated by consumers 140a-c. The communications network may be any network capable of transmitting text, voice, or data. For example, the communications network 150 may be a typical switch-based telephone network, a cellular network, a satellite network, the internet, or any proprietary wireless network. As such, the communication devices 130a-c may include desktop computers, laptops, land-line phones, cellular phones, satellite phones, smart phones, PDAs, or any other device capable of communicating across the communications network 150.

As shown in FIG. 1, the promotional system 110 may include an interface 112, a messaging platform 114 and an accounting system 116. The interface 112 is preferably configured to manage communications to and from the communications network. The messaging platform 114 is configured to manage, inbound and outbound messages in order to process discount request messages from consumers in accordance with the present invention. The promotional messaging platform is also preferably configured to communicate with the one or more operators, using appropriate communication protocols and requirements for each operator, in order to apply any promotional savings associate with a transmitted discount request message to the appropriate operator bill. The accounting system 116 is configured to manage payments and distributions to reconcile accounts between the marketers and the operators based on the amount of promotional savings that are applied within a given time period.

The promotional system 110 may also include a promotions database 118 that is configured to store information identifying one or more promotional codes associated with marketers 160a-c. For each promotional code, the database 118 may also include information identifying the corresponding marketer to which the promotional code has been assigned, a destination address associated with the promotional code, and a monetary or other value corresponding to the code.

For purposes of this description, a promotional code may be any code involving letters, numbers, or symbols, and may represent actual words or a random sequence. The promotional codes may also be unique codes utilized only in conjunction with the promotional system 100, or correspond to other information relating to a marketer's product or service, such as codes used for other promotions, UPC codes, or the like. The promotional codes may also be initially generated by the promotional system 110 and provided to marketers 160a-c, or generated by the marketers 160a-c and provided to the promotional system 110.

In one embodiment, each marketer may have access to the promotional database 118 in order to obtain and identify promotional codes assigned to it. However, as shown in FIG. 1, each marketer 160a-c may also optionally utilize a local database 162a-c, respectively, to store information about the codes assigned for that marketer. In this case, after the promotional codes are generated by the promotional system 110, the appropriate promotional codes may be transmitted to the respective marketer without granting the marketer direct access to the promotions system. Similarly, in instances where promotional codes are generated initially by a marketer, the marketer may store the promotional codes in its local database and simply transmit the codes to the promotional system 110.

Although promotions database 118 and local databases 162a-c are each illustrated as single databases, it should also be understood that each of these databases may be distributed among a plurality of individual databases. Select information for each database may also be stored at a remote location or server in order to simplify access to the data by multiple parties or client devices.

Figure 2:
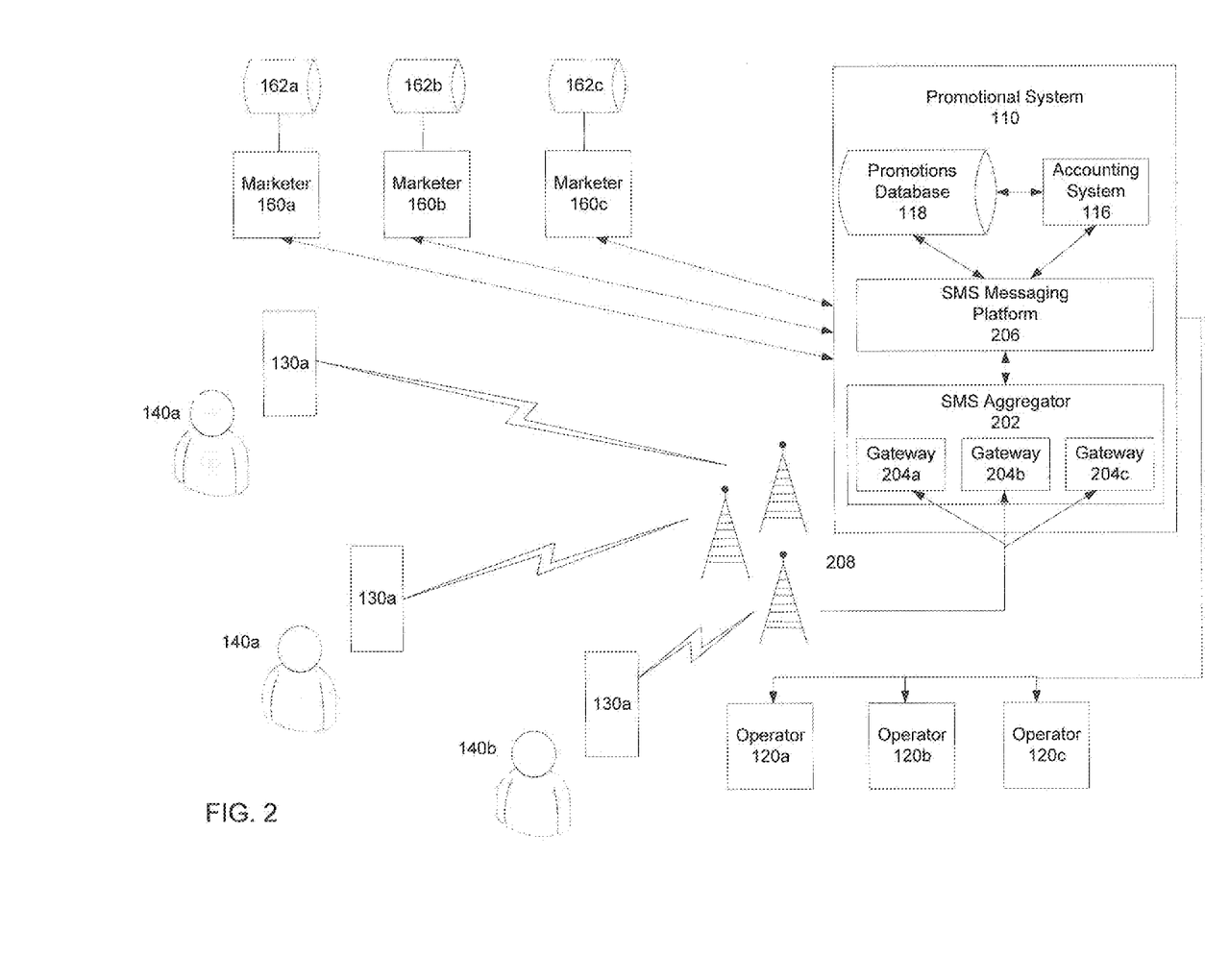
FIG. 2 shows one embodiment of a promotional system configured for use with SMS text messaging in accordance with the present invention.
Figure 3:
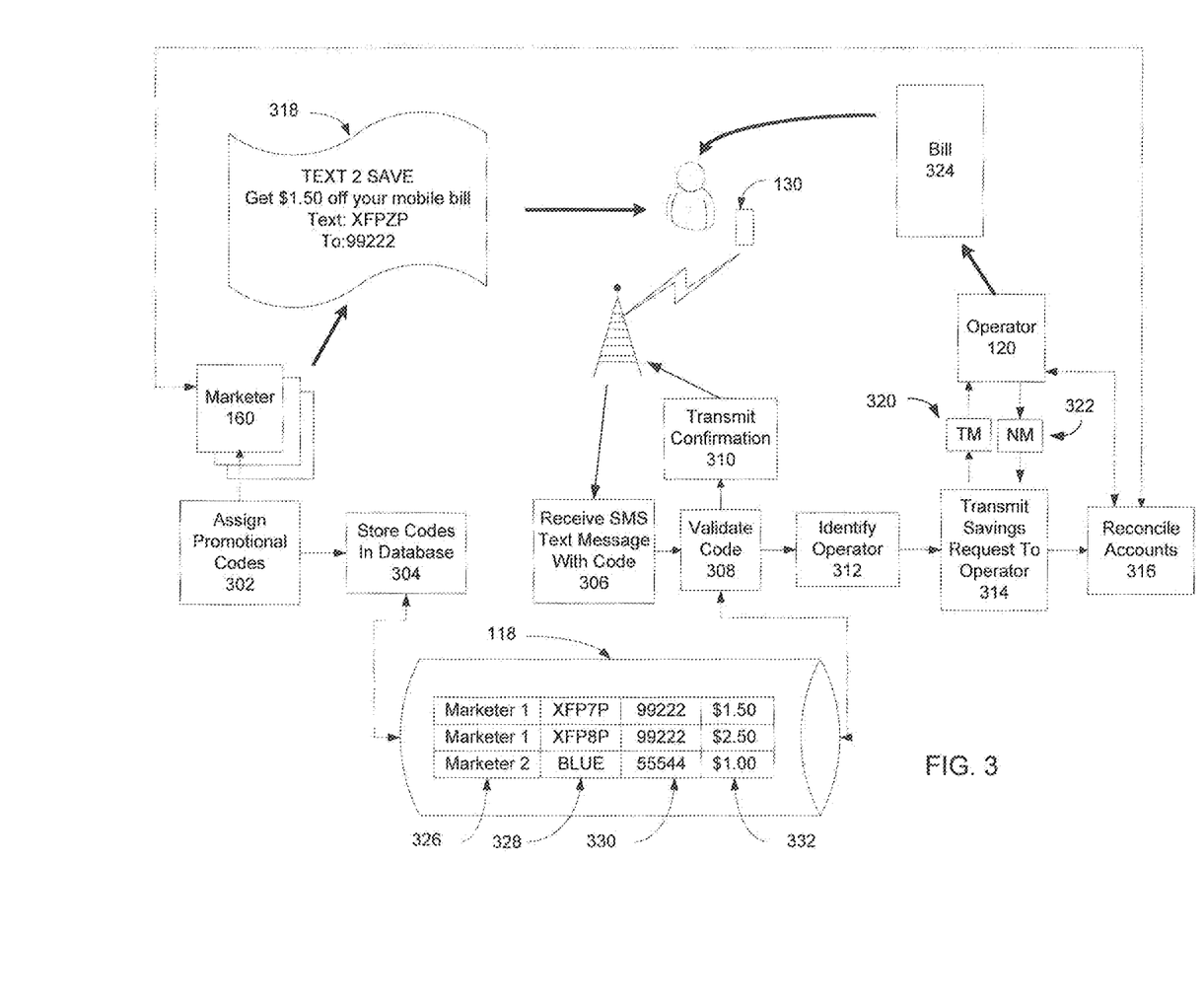
FIG. 3 shows one embodiment of a process for administering and managing promotional codes in accordance with the present invention.

To best illustrate the present invention, FIGS. 2 and 3 describes one specific embodiment in which the promotional system 110 is configured to communicate with a plurality of mobile devices 130a-c over one or more cellular networks 208 using Short Message Service "SMS" text based communications. However, it would be understood to one of ordinary skill in the art that the elements and concepts described in accordance with this embodiment may applied to a system using any type of communication devices across any type of communication network.

In the embodiment illustrated in FIG. 2, the promotional system 110 may include an SMS aggregator 202 (or similar administrative system) to interface with the cellular networks 208. The SMS aggregator 202 preferably includes one or more gateways 204a-c that are each configured to communicate with cellular base stations operated by various wireless service providers such as Verizon, AT&T, Sprint, U.S. Cellular, or the like using the appropriate communication protocols for each service provider. The SMS aggregator therefore permits the promotional system 110 to transmit and receive SMS text messages to and from consumers devices across a variety of different wireless service provider networks, each of which may be using a different communications protocol.

The promotional system 110 of FIG. 2 also includes an SMS messaging platform 206 that is coupled to the SMS aggregator and is configured to process inbound and outbound SMS text messages to and from consumer devices 130a-c. This may include parsing a promotional code from an SMS text message transmitted by a consumer device 130a-c, and validating the promotional code against information maintained in the promotions database 118. Although the SMS messaging platform 206 is shown as a separate functional block from the SMS aggregator 202, it should be understood that the SMS aggregator may also be configured to perform the functions of the SMS messaging platform.

FIG. 3 describes one exemplary process for administering and managing promotional savings using the system of FIG. 2. In step 302, one or more promotional codes are first generated and assigned to a marketer 160. As noted above, the promotional codes may be generated by either the promotional system 110 and provided to the marketer 160, or generated by the marketer 160 and provided to the promotional system 110. In step 304, the assigned promotional codes are then stored in the promotions database 118.

As shown in FIG. 3, the promotions database 118 may include information identifying the assigned promotional code 328, the marketer to whom the code is assigned 326, a destination text address that has been assigned for the promotional code 330, and/or an associated value 332. The value indicates the savings, rebate, or promotional value associated with the code. In the particular example illustrated in FIG. 3, the value represents a monetary savings to be applied to an operator bill for a consumer that utilizes the promotional code in accordance with the invention as described in more detail below.

The assigned promotional codes are placed by a marketer 160 on a product, label, advertising, software, website, or other material intended for distribution for the public. For illustrative purposes, one example of a product label 318 is shown in FIG. 3. In this example, the product label 318 identifies a code "XFP7P," a short code text number "99222" to which the code should be sent, and an indication of the value associated with the code. Although not shown in FIG. 3, the product label 318 may also include advertising information, such as the name or logo of the marketer that is responsible for the promotion. It is also understood that any type of text number may be utilized, including a full phone number, or any short code, which is typically between 3-6 digits. It is intended that after purchasing the product and obtaining the code, the consumer will follow the instructions on the product label to transmit the identified code to the identified text number.

In step 306, an SMS text message transmitted by the consumer is received by on wireless network operated by a wireless network provider, routed to the SMS aggregator 202 and passed to the SMS messaging platform 206. Although not shown, in an embodiment where the operator to whose bills the promotional savings are to be applied is a wireless network providers, the wireless network may be configured, upon receiving the SMS text message, to determine that the SMS text message is a discount request message (which may be by referencing the text number to which the message was sent, or the promotional code included in the SMS text message) and validate whether the consumer account from which the SMS text message was sent is a valid account to accept the discount. In this case, if a discount cannot be applied to the consumer account, then the SMS text message may not be routed to the SMS aggregator 202, and a message may be transmitted to the consumer informing them that a discount cannot be applied.

In step 308, the SMS messaging platform 206 parses the promotional code from the received SMS text message and checks the promotional code against information stored in the promotions database 118 to authenticate the validity of the promotional code. During the validation process, the SMS messaging platform 206 may also identify the value associated with the code. In one embodiment, the value may be code-based. That is, each promotional code may be individually assigned a value that is then identified by the SMS messaging platform 206 when a SMS text message is received. However, the value may also be based solely on the text address to which an SMS text message was sent. In this case, all messages sent to a first text address, once authenticated, would be assigned a first value, all messages sent to a second text address would be assigned a second value, and so on.

Figure 4A:
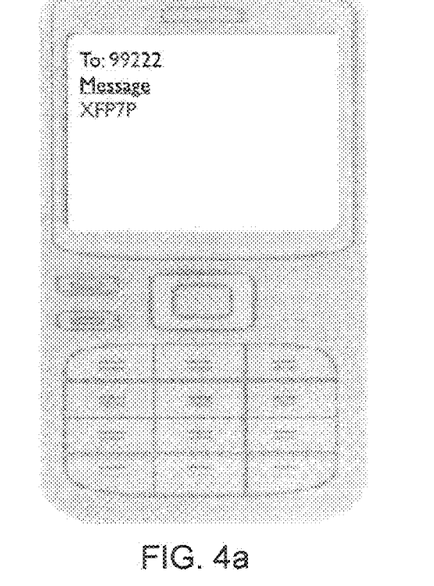
FIGS. 4a and 4b illustrate examples of an SMS discount request text message and an SMS discount confirmation text message, respectively.
Figure 4B:
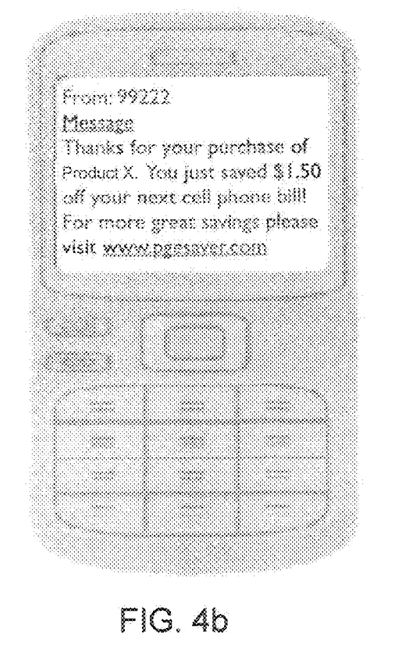

In step 310, the SMS messaging platform 206 may also send a confirmation message to the consumer to inform the consumer that the promotional code has been received, validated, and that the associated value is being applied to the consumer's account. Of course, if the promotional code is determined to be invalid, the SMS messaging platform 206 may also be configured to transmit an SMS text message to the consumer indicating that an incorrect code has been sent. For illustration purposes, FIG. 4a provides one example of a discount request SMS text message that may be sent from a consumer requesting a promotional discount in response to obtaining product label 318, and FIG. 4b provides one example a confirmation message that may be sent to the consumer from the SMS aggregator upon validating the promotional discount request message from the consumer.

Returning to FIG. 3, in step 312, the SMS messaging platform 206 identifies the operator to which the promotional saving are to be applied. For example, in one embodiment, the promotional system 110 may be configured to apply promotional savings to a wireless service provider bill for the consumer. In this case, the SMS messaging platform 206 is configured to identify on which wireless service provider network an SMS text message containing a valid promotional code was sent. Methods for identifying a wireless service provider network for a received SMS text message are well known in the art and are therefore not described in further detail herein.

In step 314, the SMS messaging platform 206 transmits, to the identified operator 120, information identifying the savings that are to be applied based on the consumer discount request SMS text message. As shown in FIG. 3, the information may be transmitted within a transaction message 320 that corresponds appropriately to the requirements of the operator billing gateway. The transaction message 320 preferably includes information identifying the consumer or consumer device that transmitted the promotional code. For example, in the case of an SMS text message, this may be the phone number from which the SMS text message containing the promotional code was transmitted. However, any other reference information may also be used. The transaction message 320 may also include information identifying the savings value that is to be applied to consumer's bill, a billing ID to identify the marketer associated with the promotional code, and/or a confirmation of validation.

In an embodiment where the operator is a wireless service provider, the transaction message 320 may be similar in format to messages communicated between typical SMS aggregators and wireless network providers in processing premium SMS messages (which are well known in the art). However, where a premium SMS message is designed to add charges to a consumer's account for various content or services (such as downloadable ringtones, or voting for a television program), the transaction message 320 in accordance with the present invention is preferably configured to instruct the wireless network provide to provide a discount to a consumer's account.

After an operator 120 receives the appropriate transaction message 320, the operator 120 processes the information contained in the received transaction message 320, and applies the promotional savings an a one-time instant rebate on a bill 324 associated with the consumer's account. After processing the transaction message, the operator may also transmit a notification message 322 to inform the promotional system 110 that the transaction message 320 has been received and the appropriate discount has been applied. Although not shown in FIG. 3, the operator may also send a billing mobile terminated message to the consumer device that initiated the discount request in order to inform the consumer that the discount will be applied to their next billing statement.

Figure 5:
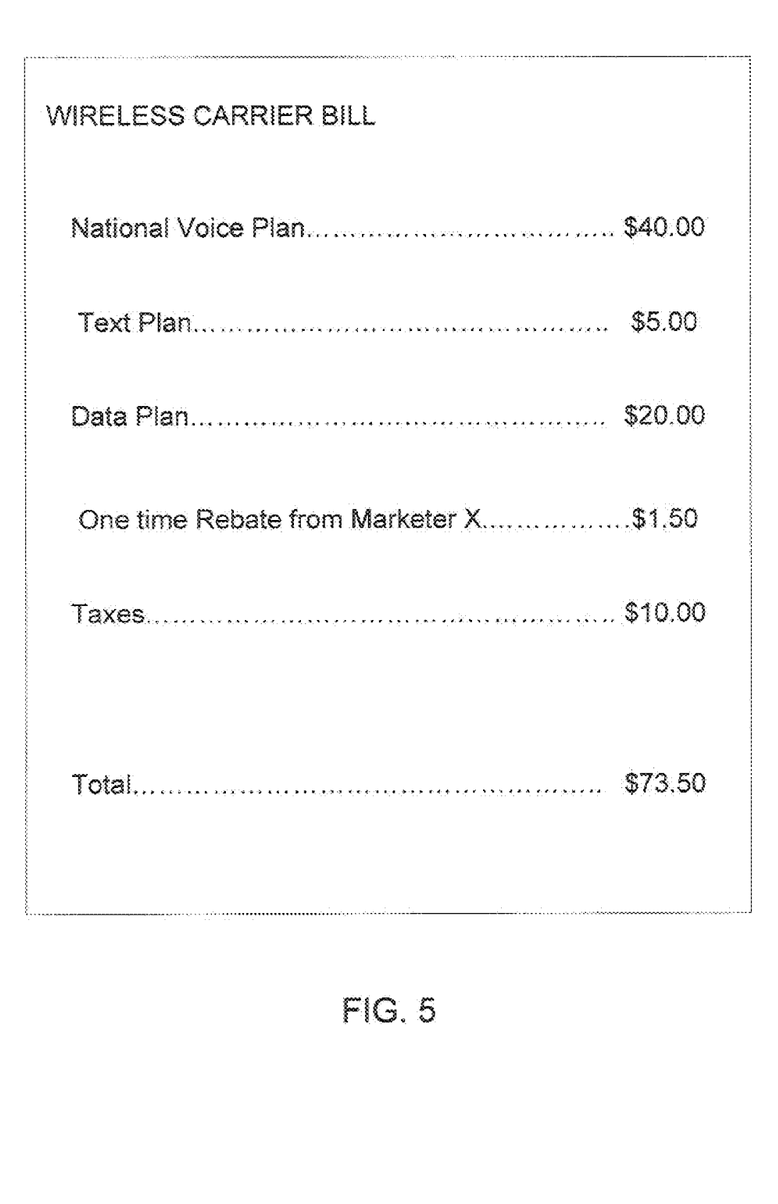
FIG. 5 illustrates one example of an operator bill in which a promotional savings is applied in accordance with the present invention.

For illustration purposes, one example of a wireless carrier bill in which a promotional savings has been applied is illustrated in 'FIG. 5. In this example, the wireless bill is for a contract/post-paid plan, but it should be understood that the promotional savings may also be applied to any other type of billing arrangement. The promotional savings description in the bill may also include the logo or name of the marketer associated with the promotion. This provides further promotion and recognition for the marketer.

Returning to FIG. 3, the accounting system 116 preferably maintains a record of the discount request messages processed for each marketer and operator and, in step 316, reconciles the marketer and operator accounts. To reconcile the accounts, the accounting system 116 obtains payment from each marketer equal to an amount of promotional discounts from that marketer deducted from consumer bills; and transmits payment to each operator equal to the amount of promotional discounts applied to each operator's consumer bills. Any fees for services provided by the promotional system 100 may also be assessed at this point. The reconciliation process is preferably performed periodically, fir example on a monthly basis, although it may be conducted at any time.

Further advantages and modifications of the above described system and method will readily occur to those skilled in the art. For example, although an embodiment using SMS text messaging has been described in detail, it is understood that promotional savings and discounts may be applied using, any interface (i.e. email, instant messaging, voice activated communications, website forms, etc.). Thus, if promotional savings are to be applied to a wireless service provider bill, any interface may be used so long as the consumer's mobile phone number or wireless service provider account can be identified from a consumer discount request message that contains an appropriate promotional code. Similarly, promotional savings may be applied to any other type of operator billing statement so long as the employed interface is capable of identifying an operator account for a consumer that provides an appropriate promotional code.

The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure cover all such modifications and variations provided they come within the scope of the following claims and their equivalents.

What is claimed is:

1. A system for processing promotion savings comprising:
   a promotional system in communication with one or more marketers, one or more operators, and one or more consumer devices via a communication network, the promotion system including:
   a promotions database for storing a plurality of promotional codes, each of the plurality of promotional codes being associated with at least one marketer and a promotional value;
   an interface for receiving discount request messages from the one or more consumer devices via the communications network, the discount request messages including at least one of the plurality of promotional codes; and
   a messaging platform for identifying a promotional code within a received discount request message, authenticating the promotional code by reference to the promotions database, identifying an operator associated with an account designated by a consumer that transmitted the discount request; and determining a promotional value associated with the promotional code,
   wherein the messaging platform is further configured to transmit to the identified operator a transaction message including information regarding the origin of the transmitted discount request message and the determined promotional value, whereby, after receiving the transaction message, the identified operator applies the determined promotional value to an operator bill associated with the consumer-designated account.

2. The system of claim 1 wherein the communication network comprises one or more cellular networks and the discount request messages are in the form of SMS text messages.

3. The system of claim 2 wherein the interface is an SMS aggregator having one or more gateways to communicate with the one or more cellular networks.

4. The system of claim 1 wherein the one or more operators are wireless service providers.

5. The system of claim 1 wherein the promotional system further includes an accounting system to reconcile financial accounts between the one or more operators and the one or more marketers based on an amount of promotional savings applied to each operator and for each marketer during a predetermined time period.

6. The system of claim 1 wherein the messaging platform determines the promotional value associated with the promotional code by parsing the promotional code from a received discount request message, locating the promotional code in the promotions database, and identifying a promotional code in the promotions database, and identifying a promotional value correlating to the promotional code.

7. The system of claim 1 wherein the messaging platform determines the promotional value associated with the promotional code by determining an address to which the promotional code was transmitted and identifying a promotional value associated with the address.

8. The system of claim 7 wherein the address is a short code text number.

9. The system of claim 1 wherein the operator provides services to the consumer and bills the consumer for the services on a regular basis.

10. The system of claim 9 wherein the promotional value is applied to the operator bill by subtracting the promotional value from an amount being billed to the consumer.

11. The system of claim 10 wherein the promotional value is applied to the next operator bill to be provided to the consumer.

12. The system of claim 1, further comprising an account reconciliation system for payment from a marketer account to an operator account.

13. A method for processing savings comprising:
   providing a promotions database for storing a plurality of promotional codes, each of the plurality of promotional codes being associated with at least at one marketer and a promotional value;
   receiving, at a communications interface, a discount request message from a consumer device, wherein the discount request messages including at least one of the plurality of promotional codes;
   authenticating the promotional code by reference to the promotions database;
   determining a promotional value associated with the promotional code; receiving information for an account designated by a consumer; identifying an operator associated with the consumer-designated account; and transmitting to the identified operator a transaction message including information regarding the origin of the transmitted discount request message and the determined promotional value, whereby, after receiving the transaction message, the identified operator applies the determined promotional value to an operator bill associated with the consumer-designated account.

14. The method of claim 13 wherein the discount request message is in the form of an SMS text message.

15. The method of claim 14 wherein the communication interface is an SMS aggregator having one or more gateways to communicate with the consumer device via one or more cellular networks.

16. The method of claim 15 wherein the identified operator is a wireless service providers.

17. The method of claim 13 further including the step of reconciling financial accounts between the identified operator and the one or more marketers based on an amount of promotional savings applied to the identified operator and for each of the one or more marketers.

18. The method of claim 13 wherein the operator provides services to the consumer and bills the consumer for the services on a regular basis.

19. The method of claim 18 wherein the promotional value is applied to the operator bill by subtracting the promotional value from an amount being billed to the consumer.

20. The method of claim 19 wherein the promotional value is applied to the next operator bill to be provided to the consumer.

21. The method of claim 13, further including the step of reconciling a marketer account and an operator account via payment from the marketer account to the operator account.

* * * * *